United States Patent [19]
Melbourne

[11] Patent Number: 5,863,277
[45] Date of Patent: Jan. 26, 1999

[54] IDLE SPEED CONTROL FOR INTERNAL COMBUSTION ENGINES

[75] Inventor: Keith Melbourne, Leederville, Australia

[73] Assignee: Orbital Engine Company (Australia) PTY Limited, Australia

[21] Appl. No.: 750,972

[22] PCT Filed: Jun. 29, 1995

[86] PCT No.: PCT/AU95/00391

§ 371 Date: Dec. 27, 1996

§ 102(e) Date: Dec. 27, 1996

[87] PCT Pub. No.: WO96/00844

PCT Pub. Date: Jan. 11, 1996

[30] Foreign Application Priority Data

Jun. 29, 1994 [AU] Australia ............................. PM 6582

[51] Int. Cl.⁶ .................................................. F02D 41/08
[52] U.S. Cl. ......................... 477/203; 477/186; 477/206; 477/904; 123/339.4
[58] Field of Search ..................................... 477/184, 185, 477/186, 203–205, 206, 207, 904; 123/339.14

[56] References Cited

U.S. PATENT DOCUMENTS

| | | | |
|---|---|---|---|
| 4,344,399 | 8/1982 | Matsumura et al. | 123/339 |
| 4,494,641 | 1/1985 | Sakakiyama | 477/179 X |
| 4,507,986 | 4/1985 | Okamura et al. | 477/43 |
| 4,653,622 | 3/1987 | Miyake . | |
| 4,760,823 | 8/1988 | Yasuoka et al. | 477/111 |
| 4,819,994 | 4/1989 | Holroyd | 303/100 |
| 4,841,447 | 6/1989 | Hayashi et al. | 123/339.24 X |
| 4,955,255 | 9/1990 | Yamaashi et al. | 477/904 X |
| 4,961,146 | 10/1990 | Kajiwara . | |
| 4,975,845 | 12/1990 | Mehta | 477/143 X |
| 5,024,197 | 6/1991 | Nakamura | 123/339.14 |
| 5,054,450 | 10/1991 | Oota et al. | 123/478 |
| 5,078,242 | 1/1992 | Ratke et al. | 477/96 X |
| 5,129,494 | 7/1992 | Rolinki et al. | 477/96 X |
| 5,235,946 | 8/1993 | Fodale et al. | 123/339 |
| 5,350,225 | 9/1994 | Steiner et al. | 303/113.4 |
| 5,402,007 | 3/1995 | Center et al. | 123/367 |
| 5,501,193 | 3/1996 | Schneider et al. | 123/339.14 |

FOREIGN PATENT DOCUMENTS

| | | |
|---|---|---|
| 31 26 893 A1 | 1/1983 | Germany . |
| 35 42 058 C1 | 2/1987 | Germany . |
| 41 40 328 A1 | 6/1993 | Germany . |
| 771649 | 4/1957 | United Kingdom . |

OTHER PUBLICATIONS

Patent Abstracts of Japan, M–709, p. 123, JP 63–12863A, 20 Jan. 1988.
Patent Abstracts of Japan, M–678, p. 35, JP 62–225727A, 3 Oct. 1987.

*Primary Examiner*—Dirk Wright
*Assistant Examiner*—Peter T. Kwon
*Attorney, Agent, or Firm*—Nikaido Marmelstein Murray & Oram, LLP

[57] ABSTRACT

A method of controlling the idle speed of an internal combustion engine of a vehicle from a first idle speed to a second idle speed that is higher than the first idle speed in response to a driver originating indication that is independent of the acceleration control of the vehicle. The higher second idle speed is set to achieve a desired level of vehicle creep. When the driver originating indication indicates that vehicle motion is no longer desired, the engine idle speed is returned to the first lower idle speed. The change between the first lower idle speed and the second higher idle speed can be accomplished in a stepping or ramping fashion. In addition, the first and second idle speeds are adjusted in response to changes in engine operating parameters such as engine coolant temperature, changes in engine load, and vehicle speed. Tilt indication means are used to determine the inclination of the vehicle and adjust the idle speed of the vehicle to achieve the desired vehicle creep when the vehicle is on an incline.

43 Claims, 3 Drawing Sheets

IDLE SPEED CONTROL FOR INTERNAL COMBUSTION ENGINES

FIELD OF THE INVENTION

This invention relates to a method for controlling the idle speed of an internal combustion engine of a vehicle. In particular, the invention will be described with reference to vehicles having automatic transmissions. It is however to be appreciated that an application of the invention is also applicable to vehicles having manual transmissions.

BACKGROUND OF THE INVENTION

A desirable feature of vehicles having an automatic transmission containing a fluid torque converter between the engine and the driving wheels is "creep" this being a motion, normally experienced on flat ground, either forward or backward, of the vehicle when the brake thereof is released, the vehicle is "in gear", and the engine speed is at idle. Such vehicle creep is considered a desirable feature in a vehicle as it allows the driver to achieve a slow, steady movement of the vehicle by merely releasing the brake and without having to depress the accelerator or throttle of the vehicle. Thus, by operation of the brake alone, the driver can selectively achieve a slow forward or rearward motion of the vehicle or maintain the vehicle stationary when it is in gear. This nature of operation of a vehicle is convenient and desirable in various traffic conditions and particularly in congested, slow moving traffic wherein the ability to achieve small movements of the vehicle without the need for the driver to move their foot away from the brake or to actuate the accelerator pedal is very desirable. It also provides the vehicle with a positive feel during maneuvering in traffic and when parking and prevents vehicle roll back to a certain degree during hill starts.

Vehicle creep is generated by the torque transmitted through the torque converter when the engine is idling in, for example, "drive". The main criteria used to select a torque converter for an engine having an automatic transmission is the engine torque characteristic. If the engine has relatively high low-speed torque, the torque converter will have a low stall speed therefore providing a "stiff" coupling. However, if the engine torque is generated at a higher speed, the torque converter will have a higher stall speed providing a "loose" coupling. This ensures that the engine speed is kept close to the speed that gives the highest torque during the commencement of movement of the vehicle and during general driving so as to achieve the best vehicle performance. Therefore, the level of creep is governed by the torque converter "stiffness" and the engine idle speed.

A number of criteria affect the selected engine idle speed for a vehicle and engine combination. These include body vibration due to any resonances caused by engine vibrations, combustion stability at low engine speeds, the accommodation of loads such as power steering, air conditioning and neutral drive transitions, and the amount of vehicle creep desired.

In a vehicle having an automatic transmission, when the vehicle is stationary and in "drive", the engine is loaded by the torque converter as it tries to rotate the input side of the torque converter with the output side of the torque converter being held stationary. Therefore, the higher the engine idle speed, the higher the loading on the engine, and the more energy, and therefore fuel, that is wasted primarily in the form of heat into the gearbox oil. Therefore, idle speed on an automatic vehicle has a significant effect on fuel economy. However, where a low idle speed is used in order to limit fuel consumption and exhaust emissions, that idle speed may be too low to achieve creep, or a desired level of creep.

In addition to not providing the desired level of creep, such a low idle speed may lead to undesirable shudders or jolts in the vehicle drive train if the driver depresses the accelerator harshly to rapidly increase engine speed from this low idle speed. This is due to the fact that at such low idle speeds, there is very little or no load appearing in the vehicle drive train including the torque converter. Accordingly, under hard acceleration, the unloaded engine is able to rapidly gain momentum until the speed thereof approaches the stall speed of the torque converter, at which point the engine suddenly takes up the torque converter load and subsequently transfers a shock through the drive train. This may be further accentuated as the drive train may become unloaded to the point that there no longer exists a pre-load between the various drive train components. In such a case, clearances may need to be taken up during the initial increase in idle speed which may lead to a noticeable physical shudder and audible impact.

In the case of vehicles having manual transmissions, it is also desirable to set the engine idle speed as low as possible. This however presents the problem that engagement of the clutch by the driver may stall the engine if the engine idling speed is too low.

SUMMARY OF THE INVENTION

It is therefore an object of the present invention to provide a method of controlling the idle speed of a vehicle engine.

With this in mind, there is provided according to one aspect of the present invention a method of controlling the idle speed of an engine of a vehicle having an automatic transmission, including increasing the engine speed from a first idle speed to a second idle speed higher than said first idle speed in response to a driver originating indication independent of an acceleration control of the vehicle that vehicle motion is desired, the higher second idle speed being set to achieve a desired level of vehicle creep.

The acceleration control of the vehicle may typically be an accelerator pedal which is depressed by the driver to accelerate the vehicle. The engine idle speed may be returned to the first idle speed when the driver originating indication indicates that vehicle motion is no longer desired.

According to another aspect of the present invention, there is provided a method of controlling the idle speed of an engine of a vehicle, including increasing the engine speed from a first idle speed to a second idle speed higher than said first idle speed in response to the release of a brake of the vehicle brake system. The engine idle speed is preferably returned to the first idle speed when the brake is re-engaged.

Preferably, in the case of a vehicle having an automatic transmission, the first idle speed can be set quite low, particularly when using multicylinder piston-ported two-stroke engines, whilst the higher second idle speed can be set to achieve a desired level of vehicle creep. In the case of a vehicle having a manual transmission, the higher second idle speed can be set to achieve desirable launch characteristics to avoid vehicle "shunt" or engine stalling. The use of the lower idle speed reduces torque converter load in the case of an automatic vehicle and hence minimizes fuel consumption.

It should be noted that a combination of other inputs together with the input from the vehicle brake system could be used to indicate that the vehicle is at rest or that the engine is disengaged from the transmission of the engine and that it is desirable to set the engine idle speed to the lower first idle speed. Such inputs may include but are not limited to vehicle road speed, a signal indicating actuation of the accelerator pedal or, in the case of a manual transmission, the clutch pedal and signals indicating the selected gear of the vehicle gearbox. Obviously, these signals or any combination thereof may also be used in conjunction with that derived from the brake system to indicate an impending launch of the vehicle or that vehicle creep is desired in response to which the first idle speed can be increased to the higher second idle speed.

In a vehicle having an automatic transmission, the method may include initially determining whether the automatic transmission is in a drive mode, including reverse and different gear selections, before increasing the engine idle speed to the higher second idle speed. The method may further include returning the engine idle speed to the first idle speed when the automatic transmission is shifted out of said drive mode.

In a vehicle having a manual transmission, the method may include initially determining whether any forward or rearward gears have been selected before increasing the engine idle speed to the higher second idle speed. The second idle speed may be maintained at all times that the manual transmission is in-gear. The method may further include returning the engine idle speed to the first idle speed when "neutral" is selected. The method may further include determining the depression of the clutch pedal of the vehicle to indicate when the clutch of the vehicle is disengaged and decreasing the engine idle speed from the second idle speed to the first idle speed in response thereto.

The method may generally include determining when the vehicle is at rest and thereby maintaining or returning the engine idle speed to the first idle speed. Furthermore, the idle speed may be rapidly changed in a stepping or a ramping fashion between the first idle speed and the higher second idle speed. It is also preferable that the ramp rate for increasing the idle speed from the first idle speed to the higher second idle speed decreases as the higher idle speed is approached. This will reduce any undesirable drive train shudders or jolts as any drive train backlash is taken up in a vehicle having an automatic transmission. Optimized ramp rates and second idle speed levels can be derived for a specific type of vehicle by experimentation, trial and error or a combination of both.

The idle speed may be increased from the first idle speed to the higher second idle speed by increasing the fuel supply rate to the engine.

Implementation of this method provides significant fuel economy gains during the engine idle condition. As a significant portion of urban driving normally requires the engine to be at idling speeds, and because 25% of the USA Federal Test Procedure drive cycle is at idle, such gains in fuel economy can have a very significant effect on overall fuel economy.

The brake light circuit of the vehicle may conveniently provide an indication of the release and engagement of the brake from a brake applied position thereof. Alternatively, a movement sensor may be used to sense the movement of a brake pedal. The movement sensor may be a switch actuated by the brake pedal to indicate displacement of the brake pedal. The point of switch actuation may be chosen to allow a degree of vehicle speed or creep control via brake application prior to the switch being actuated and the idle speed being reduced. However, the relationship between brake pedal position and stopping force from the brakes may vary significantly making pedal position unreliable for repeatable control of the idle speed. Therefore, a pressure actuated switch may alternatively be connected to the hydraulic brake line as the relationship between hydraulic pressure and brake force is likely to be more consistent. Furthermore, such pressure actuated switches may also have a degree of in-built pressure hysteresis which would be beneficial in preventing rapid cycling between engine speed levels close to the selected actuation pressure.

Alternatively, a strain gauge or other load type sensor on the brake pedal could be used. This would provide a variable analog signal representing the force applied to the brake. This signal could be provided to the engine management system which in turn could be programmed to allow the thresholds for increases in idle speed and hysteresis to be set to desired values.

A movement sensor could in addition be used for sensing the movement of the clutch pedal, the movement sensor preferably being a switch actuated by the clutch pedal to indicate displacement of the clutch pedal. Preferably, the switch would indicate the onset of depression of the clutch pedal. This would thus allow the entire time taken for full clutch pedal depression and gear selection for the engine idle speed to be increased.

Thus, preferably, the engine idle speed in a vehicle having an automatic transmission varies in a predetermined fashion from the first idle speed to the higher second idle speed as the load on the brake pedal is released from the engaged condition to the released condition. Alternatively, the engine idle speed in a vehicle having an automatic transmission may vary in a predetermined fashion from the first idle speed to the higher second idle speed as the position of the brake pedal moves from an engaged position to the released position.

A vehicle tilt indication means may also be used for providing a signal indicating the angle of inclination of the vehicle. The tilt indication means can provide both an indication of the degree of inclination, as well as whether the inclination is upward or downward (ie: positive or negative).

The tilt indication means may preferably be a tilt switch. Alternatively, the tilt indication means may be a fuel tank level indicator. The signal from the fuel tank level indicator may be "damped" by comparing the current level indication signal with the average of the level indication signals over a predetermined period, for example, over the last 30 minutes.

The level indication signal, together with other signals indicating the vehicle operating status as noted above, can be used to allow the controlled amount of creep to be achieved under different conditions.

The control method may also adjust the first and/or second idle speeds in response to changes in engine operating parameters. These parameters may, for example, include engine coolant temperature, changes in engine load or vehicle speed.

In this regard, the control method may adjust the second idle speed to provided a controlled rate of increase of the amount of creep. For example, the control method may provide a controlled amount of creep to allow a predetermined speed of forward or rearward movement regardless of whether, for example, the vehicle is on an upward or downward decline, is towing a trailer or the engine is cold. The control method may also provide a controlled amount of creep to maintain the vehicle stationary when the vehicle is on an upward incline such that there is no rearward roll-back of the vehicle. Alternatively the control method may provide no creep when the vehicle is on a downward incline and the vehicle is in a drive mode. Creep may however be provided by the control method when the vehicle is on a downward incline and a reverse or rearward motion is desired.

According to yet another aspect of the present invention, there is provided a vehicle engine control system for a vehicle having an automatic transmission, including control means for increasing the engine speed from a first idle speed to a second idle speed higher than said first idle speed in response to a driver originating indication independent of an acceleration control of the vehicle that vehicle motion is desired, the higher second idle speed being set to achieve a desired level of vehicle creep.

According to a further aspect of the present invention, there is provided a vehicle engine control system for a vehicle, including control means for increasing the engine speed from a first idle speed to a second idle speed higher than said first idle speed in response to the release of a brake of the vehicle brake system. The means is also capable of returning the engine speed to the first idle speed upon re-engagement of the brake.

The method of the present invention is particularly applicable to direct injected two stroke engines because of the low idle speeds that can be achieved due to the firing frequency and the speed of response to fuelling changes. That is, the low idle speeds can be achieved and very rapid changes in speeds can be achieved such that the utilization of this control method would not be apparent to the driver. However, this control method is also applicable for four stroke and other engines.

The above described management of the engine fuelling rate in the transition from the first idle speed to the second higher idle speed can be incorporated in a conventional electronic management system by those skilled in the art. It will be appreciated that the fuelling rate will be influenced in the known manner by other conditions of operation of the engine such as engine coolant temperature, and other loads on the engine such as from air conditioners, heaters and lights. Those experienced in the art can readily program the electronic management system to accommodate these factors.

DESCRIPTION OF THE PREFERRED EMBODIMENTS

To facilitate an understanding of the present invention, reference is made to the accompanying drawing which illustrates an example embodiment of the method of controlling the idle speed of a vehicle engine according to the present invention. It is to be appreciated that this is only one example embodiment of the present invention and that there are alternative ways of implementing the control method of the present invention.

Figure 1:
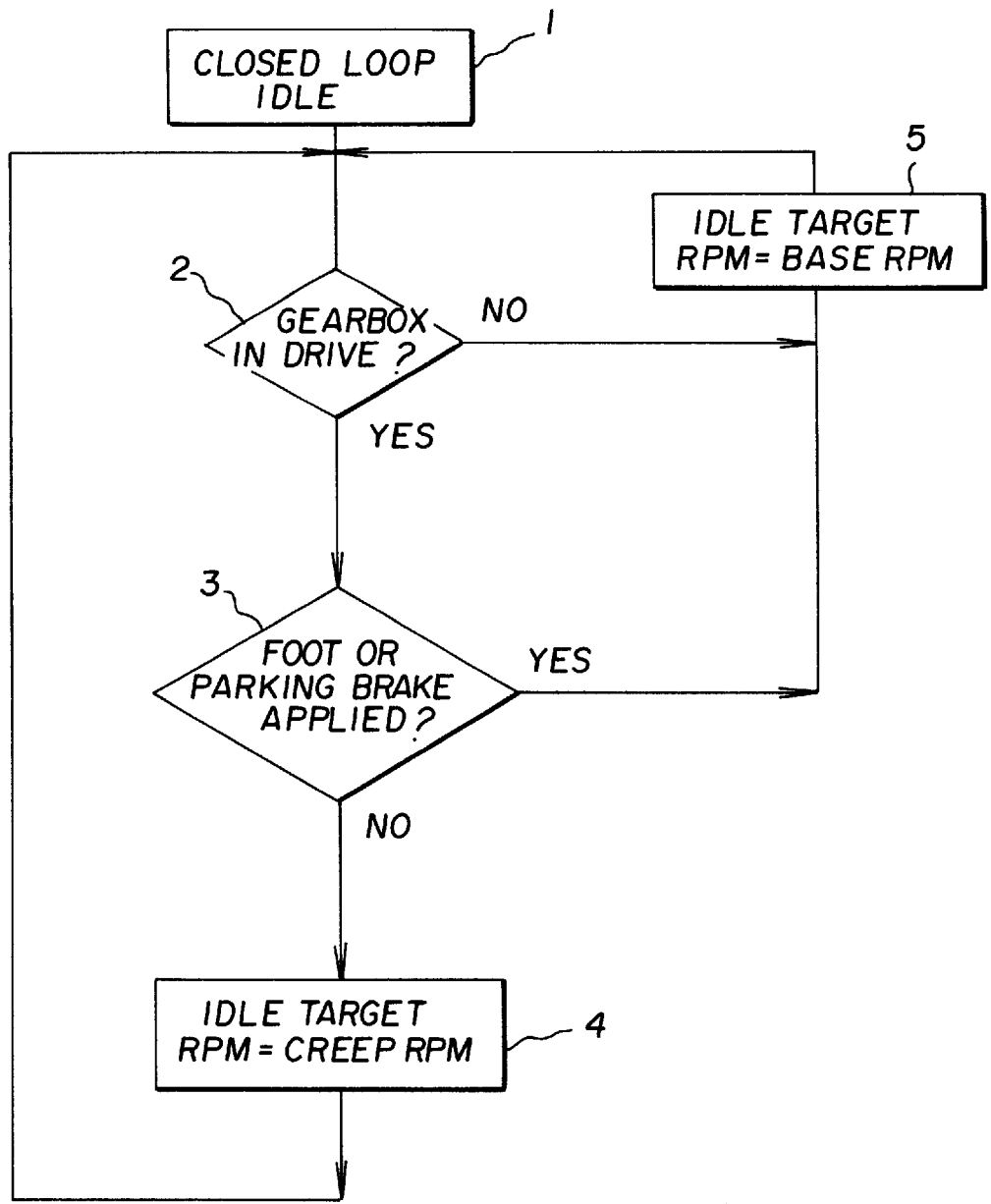
FIG. 1 is a flow diagram of the control strategy of the electronic control unit of the engine management system of a vehicle in accordance with the present invention.

FIG. 1 shows a flow diagram of the control strategy of the electronic control unit (ECU) of the engine management system of a vehicle having an automatic transmission according to the method of the present invention.

It is common practice in engine management systems to perform "closed loop idle" control of the idle speed of the engine. Under such control, the actual engine idle speed is compared with a desired target idle speed at regular intervals. If the engine idle speed is higher or lower than the target valve, then the idle speed is returned to the desired valve. At step 1 of the flow diagram, the ECU is providing closed loop idle control of the engine idle speed.

At step 2, the ECU periodically checks whether the gearbox is in a drive mode which includes any forward or rearward gear selections. If the gearbox is not in a drive mode, then the desired target engine idle speed is maintained or set to a low normal or "base" idle speed at step 5. However, if the gearbox is in "a drive mode", then the ECU checks to see if the foot or parking brake is applied in step 3. If the foot or parking brake is applied, then the desired target engine idle speed is maintained or set to the low normal or "base" idle speed at step 5. If however the foot or parking brake is not applied, then the desired target engine idle speed is set at a higher or "creep" engine idle speed at step 4. This higher idle speed is maintained until the speed of the engine is increased in response to an increase in the driver load demand, the gearbox is returned to "neutral", or the foot or parking brake is applied at which time the engine idle speed is reset to the low normal idle speed.

For simplicity, this flow diagram does not show the step or ramping function step that may occur as the target engine idle speed is changed from one value to another, however, it is to be appreciated that such functions can be incorporated into the control strategy as required.

Figure 2:
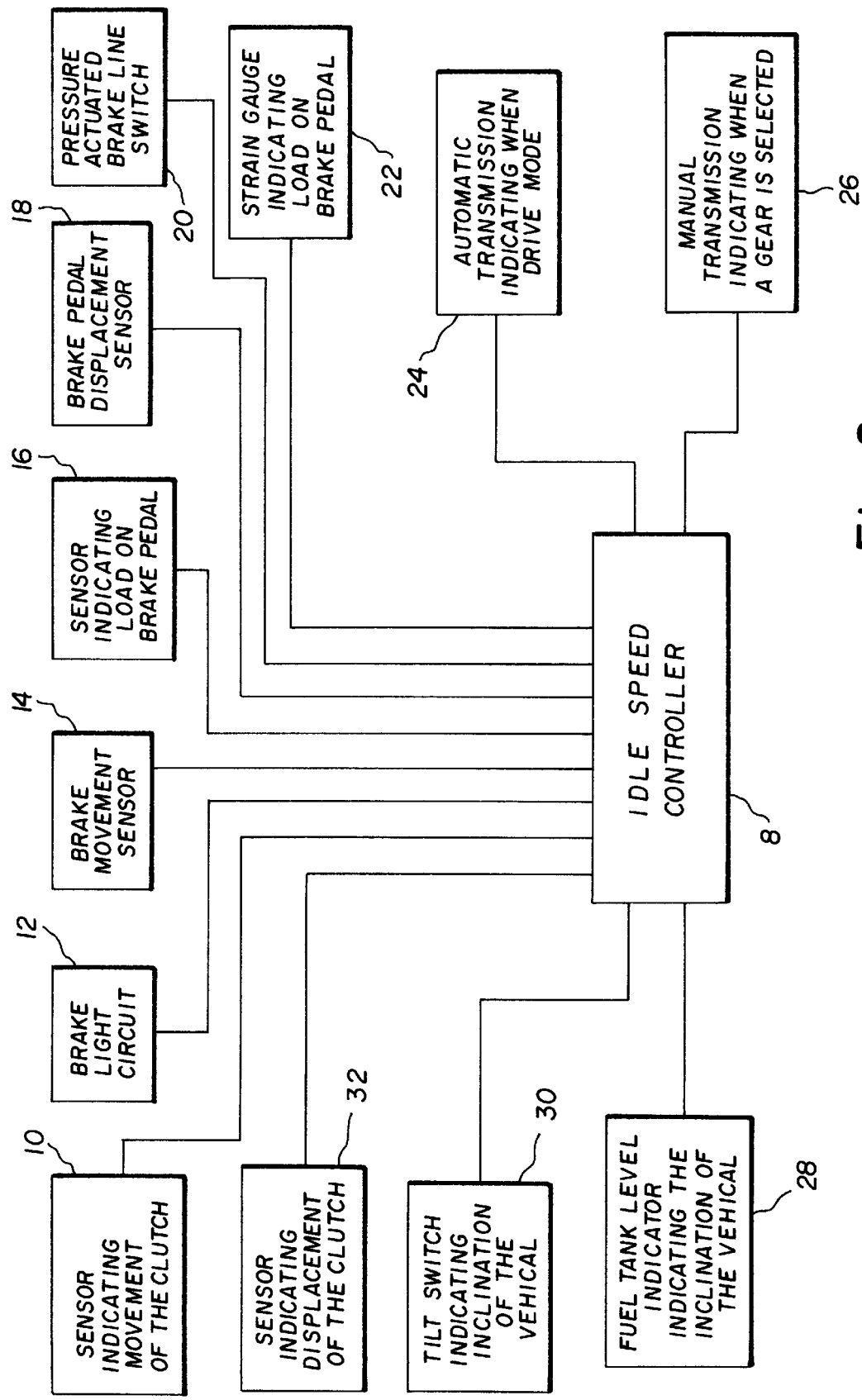
FIG. 2 is a block diagram showing a variety of sensors that can provide inputs to the idle speed controller in accordance with the present invention.

Referring now to FIG. 2, a number of the sensors that can be used to determine when to vary the idle speed in accordance with the present invention are shown. The idle speed controller 8 receives signals from the sensors and determines when to vary the idle speed based on these signals. These signals can be produced by a variety of methods and sensors including a sensor 10 that indicates movement of the clutch in a vehicle with a manual transmission, a brake light circuit 12 that activates the brake lights of a vehicle in response to the brakes being engaged, a movement sensor 14 that indicates movement of the brake pedal, a load sensor 16 that indicates the load placed on the brake pedal, a displacement sensor 18 that measures the displacement of the brake pedal, a pressure activated switch 20 that detects changes in the pressure in the brake line of a vehicle, a strain gauge 22 that indicates the load placed on the brake pedal, a drive mode sensor 24 that indicates when an automatic transmission is placed in a certain drive mode, a sensor 26 that indicates when a manual transmission is placed in gear, a displacement sensor 32 that indicates displacement of the clutch pedal, a tilt switch 30 that indicates the inclination of a vehicle, or a fuel tank level indicator 28 that indicates the inclination of a vehicle. It is appreciated that the output from the sensors could be used singularly or in combination with one another to determine when to vary the idle speed from the first idle speed to the second idle speed.

Figure 3:
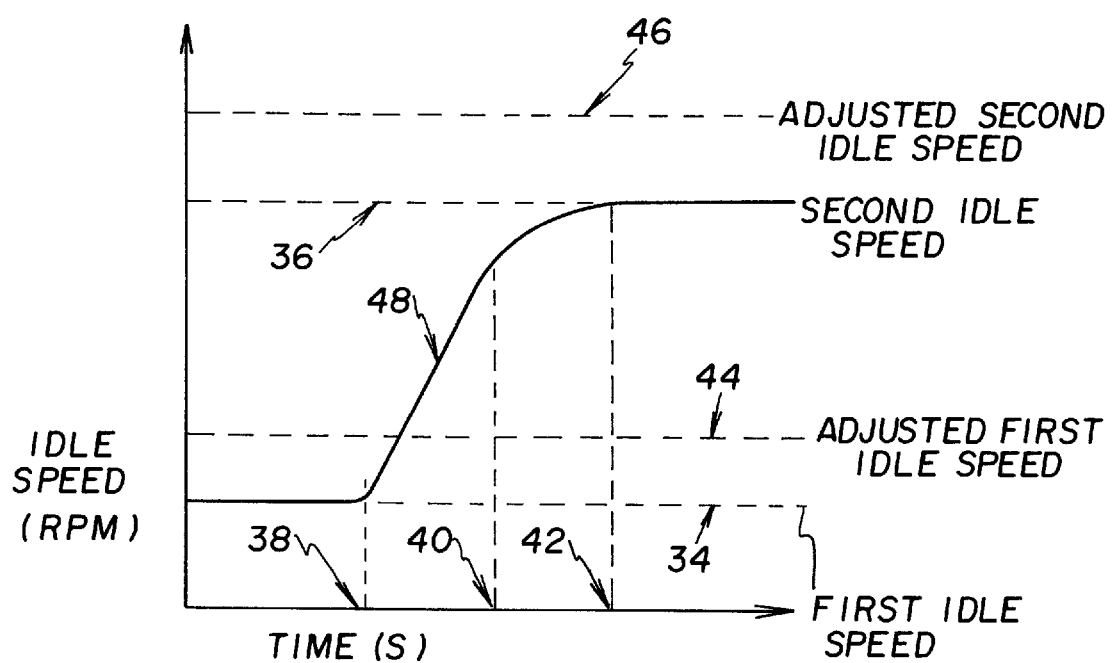
FIG. 3 is graphical representation of a ramping function of a preferred embodiment of the present invention.

Referring now FIG. 3, a graph is shown that illustrates how the idle speed can be ramped up between the first and second idle speeds. When the idle speed controller 8 determines that the idle speed should be increased from the first idle speed 34 to the second idle speed 36, the idle speed controller begins increasing the idle speed at a substantially constant rate from time 38 to time 40. However, in a preferred embodiment, the idle speed controller 8 increases the idle speed at a gradually decreasing rate from time 40 to time 42. As previously stated, ramping down the increase in idle speed as shown in FIG. 3 reduces undesirable drive train shudders that may result as drive train backlash is taken up in a vehicle.

FIG. 3 also shows how the first 34 and second 36 idle speeds can be adjusted based on measured engine operating parameters. For example, suppose the idle speed controller has been adjusting the idle speed between a first idle speed 34 and a second idle speed 36 when a temperature sensor indicates that the engine coolant temperature has fallen below a desirable level. In response to the decreased engine coolant temperature, the idle speed controller may adjust the first 34 and second 36 idle speeds to new adjusted first 44 and second 46 idle speeds that are respectively higher. This will allow the vehicle to increase the idle speeds until the engine coolant temperature has risen to an acceptable level. The ramping function used to increase or decrease the idle speed between the new adjusted idle speeds 44 and 46 may be the same ramp function 48 used at the original idle speeds 34 and 36.

I claim:

1. A method of controlling the idle speed of an engine of a vehicle having an automatic transmission, including increasing the engine speed from a first idle speed to a second idle speed higher than said first idle speed in response to a driver originating indication independent of an acceleration control of the vehicle that vehicle motion is desired, the higher second idle speed being set to achieve a desired level of vehicle creep.

2. A method according to claim 1, wherein the acceleration control of the vehicle is an accelerator pedal which is depressed by the driver to accelerate the vehicle.

3. A method according to claim 1, including returning the engine idle speed to the first idle speed when the driver originating indication indicates that vehicle motion is no longer desired.

4. A method of controlling the idle speed of an engine of a vehicle, including increasing the engine speed from a first idle speed to a second idle speed higher than said first idle speed in response to the release of a brake of the vehicle brake system.

5. A method according to claim 4, wherein the engine idle speed is returned to the first idle speed when the brake is re-engaged.

6. A method according to claim 4, wherein a brake light circuit of the vehicle provides an indication of the release and engagement of the brake.

7. A method according to claim 4, wherein a movement sensor senses the movement of a brake pedal from a brake applied position thereof.

8. A method according to claim 7, wherein the movement sensor is a switch actuated by the brake pedal to indicate displacement of the brake pedal.

9. A method according to claim 4, including a pressure actuated switch connected to a brake line of the vehicle brake system to provide an indication of the release and engagement of the brake.

10. A method according to claim 4, including a load sensor for detecting the load applied to a brake pedal to provide an indication of the engagement of the brake.

11. A method according to claim 10, wherein the load sensor is a strain gauge mounted on the brake pedal.

12. A method according to claim 4, wherein the vehicle has an automatic transmission, including initially determining whether the automatic transmission is in a drive mode before increasing the engine idle speed to the higher second idle speed.

13. A method according to claim 12, including returning the engine idle speed to the first idle speed when the automatic transmission is out of the drive mode.

14. A method according to claim 12, wherein the second idle speed is adjusted such that a desired level of vehicle creep is provided.

15. A method according to claim 4, wherein the vehicle has a manual transmission, including initially determining whether a forward or rearward gear of the manual transmission has been selected before increasing the engine idle speed to the higher second idle speed.

16. A method according to claim 15, wherein the second idle speed is maintained when the manual transmission is in gear.

17. A method according to claim 15, including returning the engine idle speed to the first idle speed when neutral of the manual transmission is selected.

18. A method according to claim 15, further including determining the depression of a clutch pedal of the vehicle to indicate when the clutch of the vehicle is being disengaged and decreasing the engine idle speed from the second idle speed to the first idle speed in response thereto.

19. A method according to claim 18, wherein a movement sensor senses the movement of the clutch pedal.

20. A method according to claim 19, wherein the movement sensor is a switch actuated by the clutch pedal to indicate displacement of the clutch pedal.

21. A method according to claim 1, including determining when the vehicle is at rest and thereby maintaining or returning the engine idle speed to the first idle speed.

22. A method according to claim 1, wherein the idle speed is rapidly changed in a stepping or a ramping fashion between the first idle speed and the higher second idle speed.

23. A method according to claim 22, wherein the ramp rate for increasing the idle speed decreases as the second idle speed is approached.

24. A method according to claim 1, wherein the first and second idle speeds are adjusted in response to changes in engine operating parameters.

25. A method according to claim 24, wherein the engine operating parameters include engine coolant temperature, and changes in engine load or vehicle speed.

26. A method according to claim 1, wherein at least the second idle speed is adjustable in response to the inclination of the vehicle.

27. A method according to claim 26, wherein the inclination of the vehicle is determined by a tilt switch.

28. A method according to claim 26, wherein the inclination of the vehicle is determined by a fuel tank level indicator.

29. A method according to claim 1, wherein the idle speed is increased from the first idle speed to the second idle speed by increasing the fuel supply rate to the engine.

30. A vehicle engine control system for a vehicle having an automatic transmission including control means for increasing the engine speed from a first idle speed to a second idle speed higher than said first idle speed in response to a driver originating indication independent of an acceleration control of the vehicle, that vehicle motion is desired, the higher second idle speed being set to achieve a desired level of vehicle creep.

31. A vehicle engine control system for a vehicle, including control means for increasing the engine speed from a first idle speed to a second idle speed higher than said first idle speed in response to the release of a brake of a vehicle brake system.

32. A system according to claim 31, wherein said control means is adapted to return the engine speed to the first idle speed in response to re-engagement of the brake.

33. A system according to claim 31, wherein a brake light circuit of the vehicle provides an indication of the release and engagement of the brake.

34. A system according to claim 31, including a movement sensor for sensing the movement of a brake pedal from a brake applied position thereof.

35. A system according to claim 34, wherein the movement sensor is a switch actuated by the brake pedal to indicate displacement of the brake pedal.

36. A system according to claim 31, including a pressure actuated switch connected to a brake line of the brake system to provide an indication of the release and engagement of the brake.

37. A system according to claim 31, including a load type sensor for detecting a load applied to a brake pedal of the brake system to provide an indication of the engagement of the brake.

38. A system according to claim 37, wherein the load type sensor is a strain gauge mounted on the brake pedal.

39. A system according to claim 31, further including a movement sensor for sensing the movement of a clutch pedal.

40. A system according to claim 39, wherein the movement sensor is a switch actuated by the clutch pedal to indicate displacement of the clutch pedal.

41. A system according to claim 31, further including tilt indication means for determining the inclination of the vehicle.

42. A system according to claim 41, wherein the tilt indication means is a tilt switch.

43. A system according to claim 41, wherein the tilt indication means is a fuel tank level indicator.

* * * * *